May 28, 1957  K. W. JAY  2,793,752
FULL FLOW INLINE FILTER
Filed Sept. 7, 1954  2 Sheets—Sheet 1

INVENTOR
K. W. JAY
BY: Maybee & Legris
ATT'YS

May 28, 1957  K. W. JAY  2,793,752
FULL FLOW INLINE FILTER
Filed Sept. 7, 1954  2 Sheets-Sheet 2
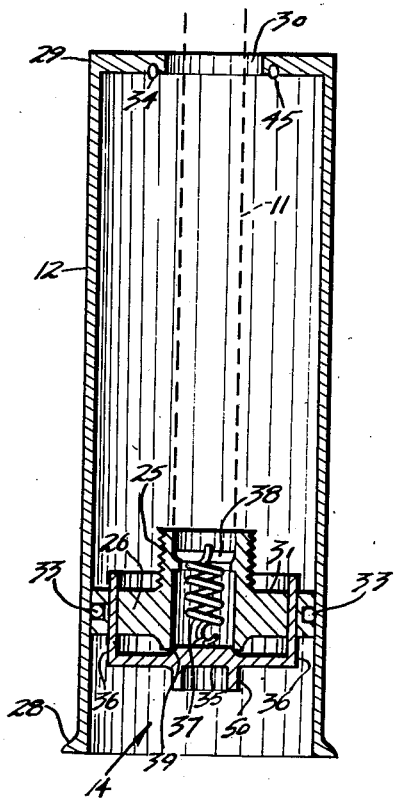
Fig. 2
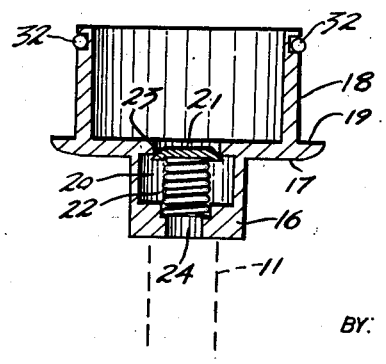
INVENTOR
K. W. JAY
BY: Mayhew & Laylin
ATT'YS

United States Patent Office 2,793,752
Patented May 28, 1957

2,793,752
FULL FLOW INLINE FILTER

Kenneth William Jay, York Township, Ontario, Canada, assignor to A. V. Roe Canada Limited, Malton, Ontario, Canada, a corporation Application September 7, 1954, Serial No. 454,531

2 Claims. (Cl. 210—130)

This invention relates to filters and more particularly to oil filters for internal combustion engines.

The filters in use at the present time suffer from the disadvantage that, due to the fluid connections with which they are provided, they must be mounted at specific points where they can be connected to the fluid line. This sometimes leads to difficulty in servicing the filters because when the engine is enclosed the filters are not always easily accessible. This is often the case in aircraft engines.

In-line filters have been used which can be installed anywhere along a fluid line but without much success since it is necessary to either drain the fluid system or suffer a loss of fluid when the filter is removed for cleaning or replacing.

It is an object of the present invention to provide an in-line fluid filter which is easily and quickly disassembled for servicing without the necessity of draining the system and without suffering any appreciable loss of fluid.

According to the invention a filter is provided having two end members each having a fluid passage therein with a normally closed valve in each passage. A filter core lies between the two end members and means are provided on the core to maintain the valves in the open position when the core is in position. A casing surrounds both the end members and the core.

The invention will now be described in detail with reference to the accompanying drawings in which like reference numerals denote like parts in the various views and in which:

Figure 2 is a longitudinal sectional view with the filter core removed and

Figure 1:
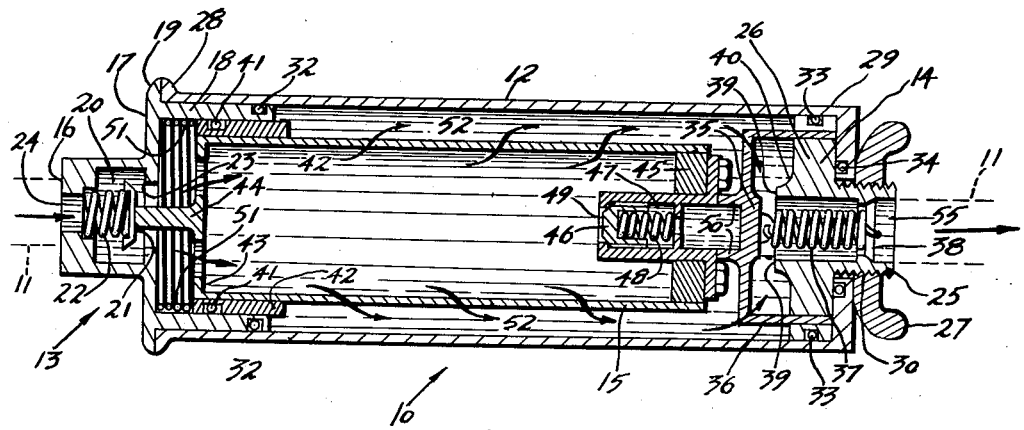
Figure 1 is a longitudinal sectional view with the filter in the operative position.

In the drawings a filter which is shown generally at 10 may be installed anywhere along a fluid line 11. The means for coupling the filter 10 to line 11 is well known in the art and, as it forms no part of this invention, will not be described. The filter itself consists of four main parts; an outer casing 12, two end members 13 and 14 and a filter core 15.

In greater detail, the end member 13 consists of a boss 16 having a radially extending flange 17 which carries an axially extending cylindrical wall 18. The cylinder 18 is of somewhat smaller diameter than flange 17 and therefore a portion 19 of flange 17 extends beyond the cylinder wall. The boss 16 has an internal valve chamber 20 containing an inlet valve 21 and a valve spring 22 which urges the valve 21 into engagement with shoulders 23 of a valve seat. When closed, the inlet valve 21 stops the flow of fluid from line 11 into the filter through a fluid passage 24 in the end member 13. The other end member 14 also has a boss 25 and a radially extending flange 26. The exterior surface of boss 25 is threaded to engage a wing nut 27 which holds a cylindrical casing 12 in place. The casing 12 is open at end 28 and is closed at end 29 where it is provided with a central aperture 30 adapted to admit boss 25. Sealing rings 32 and 33 are provided on the outer surface of end members 13 and 14 and another ring 34 lies in the inner surface of the closed end 29 of casing 12. These rings provide a leak proof seal between the end members 13, 14 and the casing 12. The casing 12 is adapted to slide over end members 13 and 14 with its open end 28 abutting portion 19 of flange 17 and with its other end 29 in abutment with face 31 of flange 26. The wing nut 27 is tightened on boss 25 to hold casing 12 securely in place.

An outlet valve is provided in end member 14 to control the flow of fluid through passage 55 from the filter. The outlet valve consists of a plate 35 having legs 36 which extend through holes in end member 14. A tension spring 37 is secured between the valve plate 35 and pin 38 lying across passage 55 to urge the plate towards abutment with the shoulders 39 of valve seat 40.

The filter core is a hollow cylinder and may be made from any of the well known filtering materials depending upon the nature of the fluid upon which it is to act. The end of the core 15 which lies adjacent end member 13 carries a sealing ring 41 which is adapted to bear against the inner surface of the cylinder 18. The ring 41 is preferably set in a sleeve 42 which surrounds the core 15 at this end. An apertured web 43 spans the end of core 15 and is provided with a central projection 44 which, when the core is in position bears against inlet valve 21 and causes it to open against the pressure of spring 22.

The opposite end of the filter core 15 is closed by an inwardly extending flange 45 and a relief valve 46. The relief valve 46 lies in a valve chamber 47 and is urged by a spring 48 against a valve seat 49 to close the end of the filter core 15.

When the filter core is in position as shown in Fig. 1, projection 44 maintains inlet valve 21 in the open position while end 29 of the outer casing 12 bears against legs 36 of outlet valve 35 to maintain it in the open position against spring 37. In addition a spring 51 bearing against flange 17 and web 43 urges core 15 into abutment with the projections 50 on outlet valve plate 35 to give support to one end of the core. The fluid in line 11 enters through passage 24, inlet valve 21 and through apertured web 43 into the core 15. The pressure in line 11 forces a fluid through the walls of core 15 as indicated by the arrows while sealing strip 41 prevents any leakage around the end of the core. From the space 52 between the core and the casing the fluid passes back into line 11 by way of outlet valve 35. If the core 15 should become clogged with foreign matter so that fluid will not pass therethrough, relief valve 46 will be forced open by the fluid against the action of the spring 48 to relieve the pressure. When the filter is to be removed for cleaning, replacing or other purposes, the wing nut 27 is unscrewed, the casing 12 slid back and the core 15 taken out. The withdrawal of casing 12 automatically closes the outlet valve 35 by allowing spring 37 to draw valve 35 into engagement with shoulders 39 at the valve seat 40, while removal of the core itself withdraws projection 44 from the inlet valve 21 and allows it to close automatically. The closure of these two valves completely stops the flow of fluid in the line and obviates the necessity of draining the line before removing the filter.

Figure 3:
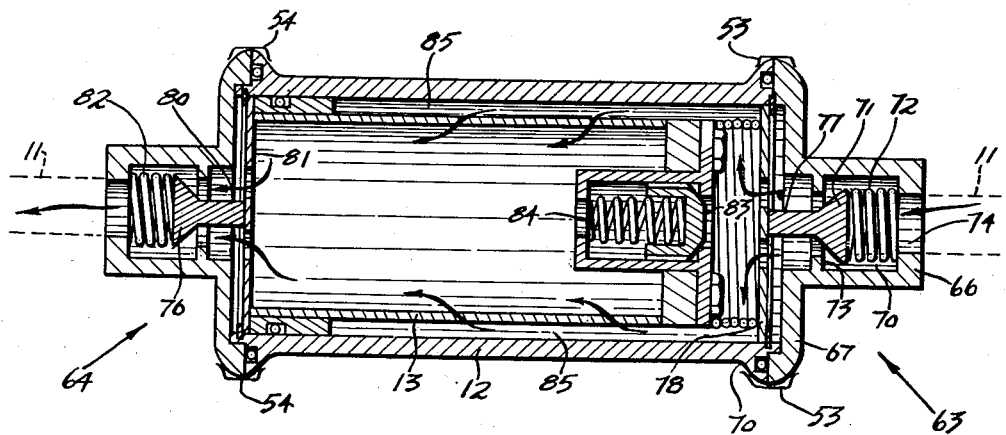
Figure 3 is a longitudinal sectional view of another embodiment of the invention.

In Figure 3 another form which the invention may take is illustrated. This embodiment differs from the embodiment shown in Figure 1 principally in that casing 12 and the core 15 are adapted to be removed simultaneously by releasing ring clamps 53 and 54 and pulling the casing in a radial direction.

End member 63 consists of a boss 66 which houses a valve chamber 70 and has a radially extending flange 67. An inlet valve 71 in chamber 70 is urged towards the closed position in abutment with a valve seat 73 by a spring 72 but is prevented from closing by a rod 77 on the inlet valve which bears against an apertured plate 78, on the filter core. An outlet valve is maintained in the open position in the other end member 64 by means of a rod 80 on the outlet valve bearing against an apertured plate 81 on the filter core against the action of spring 82. A relief valve 83 in core 15 is maintained closed by a spring 84 against the pressure of the fluid in the system.

In this embodiment the fluid enters as shown by the arrows, through passage 74 in member 63, passes through the inlet valve 71 and apertured plate 78 into the space 85 between the core and the casing. The pressure of the fluid forces it through the casing and it passes out through the outlet valve 76 into line 11.

When ring clamps 53 and 54 are released and casing 12 and core 15 removed, springs 72 and 82 automatically close the inlet and outlet valves to retain the fluid in the system.

From the foregoing description it will be evident that a filter has been invented which can be installed at any point along a fluid line and which can be easily and quickly disassembled for cleaning and replacing without draining the system of fluid.

It will be appreciated that alterations and modifications can be made in the structure of the invention without departing from the spirit of the invention the scope of which is defined by the appended claims.

What I claim as my invention is:

1. In a fluid filter, a casing, an end member having a fluid passage therein at each end of the casing, a hollow filter core between the end members and having its internal cavity in communication with one fluid passage, a spring biased, normally closed inlet valve in the fluid passage of one end member and a spring biased, normally closed outlet valve in the fluid passage of the other end member, means carried by the filter core to maintain one of the valves in the open position when the core is between the end members and spring means associated with one end member to urge the filter core towards the opposite end member.

2. In a fluid filter, a casing, an end member at each end of the casing each having a fluid passage therein, a spring biased, normally closed inlet valve in the fluid passage of one end member and a spring biased, normally closed outlet valve in the fluid passage of the other end member, a filter core between the end members, the filter core having an internal cavity open at one end and in communication thereby with one passage containing the inlet valve, a spring biased, normally closed relief valve in the closed end of the cavity in the filter core, means on the core to maintain the inlet valve in the open position when the core is located between the end members and means on the casing to maintain the outlet valve in the open position when the casing is in sealing position between the end members.

References Cited in the file of this patent

UNITED STATES PATENTS

| | | |
|---|---|---|
| 502,583 | Rankine | Aug. 1, 1893 |
| 1,076,128 | Kupferle | Oct. 21, 1913 |
| 1,496,947 | Robinson | June 10, 1924 |
| 1,746,336 | Breer | Feb. 11, 1930 |
| 1,909,308 | Nugent | May 16, 1933 |
| 2,189,361 | Hoge | Feb. 6, 1940 |
| 2,342,669 | Hoffman | Feb. 29, 1944 |
| 2,518,299 | Fernandez | Aug. 8, 1950 |

FOREIGN PATENTS

| | | |
|---|---|---|
| 157,669 | Great Britain | Jan. 27, 1921 |